United States Patent [19]

Maejima

[11] Patent Number: 4,978,289
[45] Date of Patent: Dec. 18, 1990

[54] FILM EXTRUSION DIE

[75] Inventor: Mokichi Maejima, Tokyo, Japan

[73] Assignee: Jyohoku Seiko Co., Ltd., Tokyo, Japan

[21] Appl. No.: 417,442

[22] Filed: Oct. 5, 1989

[51] Int. Cl.⁵ .................. B29C 47/16; B29C 47/92
[52] U.S. Cl. .................... 425/141; 425/381; 425/466
[58] Field of Search ............ 425/141, 381, 466, 133.5

[56] References Cited

U.S. PATENT DOCUMENTS

| | | | | |
|---|---|---|---|---|
| 3,940,221 | 2/1976 | Nissel | ................................. | 425/141 |
| 4,125,350 | 11/1978 | Brown | ........................... | 425/141 X |
| 4,734,922 | 3/1988 | Harris | ............................. | 425/141 X |
| 4,741,686 | 5/1988 | Cazzani et al. | ..................... | 425/381 |
| 4,781,562 | 11/1988 | Sano et al. | ....................... | 425/466 X |
| 4,863,361 | 9/1989 | Boos | ............................... | 425/381 X |

Primary Examiner—Richard L. Chiesa
Attorney, Agent, or Firm—Bucknam and Archer

[57] ABSTRACT

A T-shaped film extrusion die having a T-shaped die main body, a device for detecting the thickness of a resin film formed by extrusion to generate a detection signal, a device for generating a correction signal on the basis of a difference between the detection signal and preset thickness data, and a lip-width adjusting device for driving lip-width adjusting bolts on the basis of the correction signal to adjust the width between lips of the die so that the resin film has a preset thickness.

2 Claims, 9 Drawing Sheets

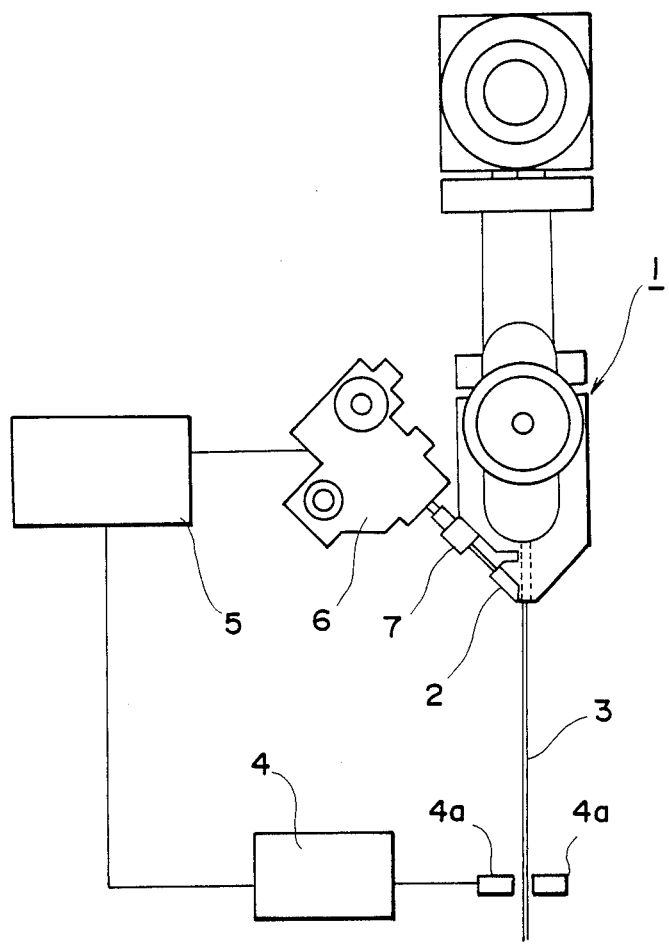
F I G. 1

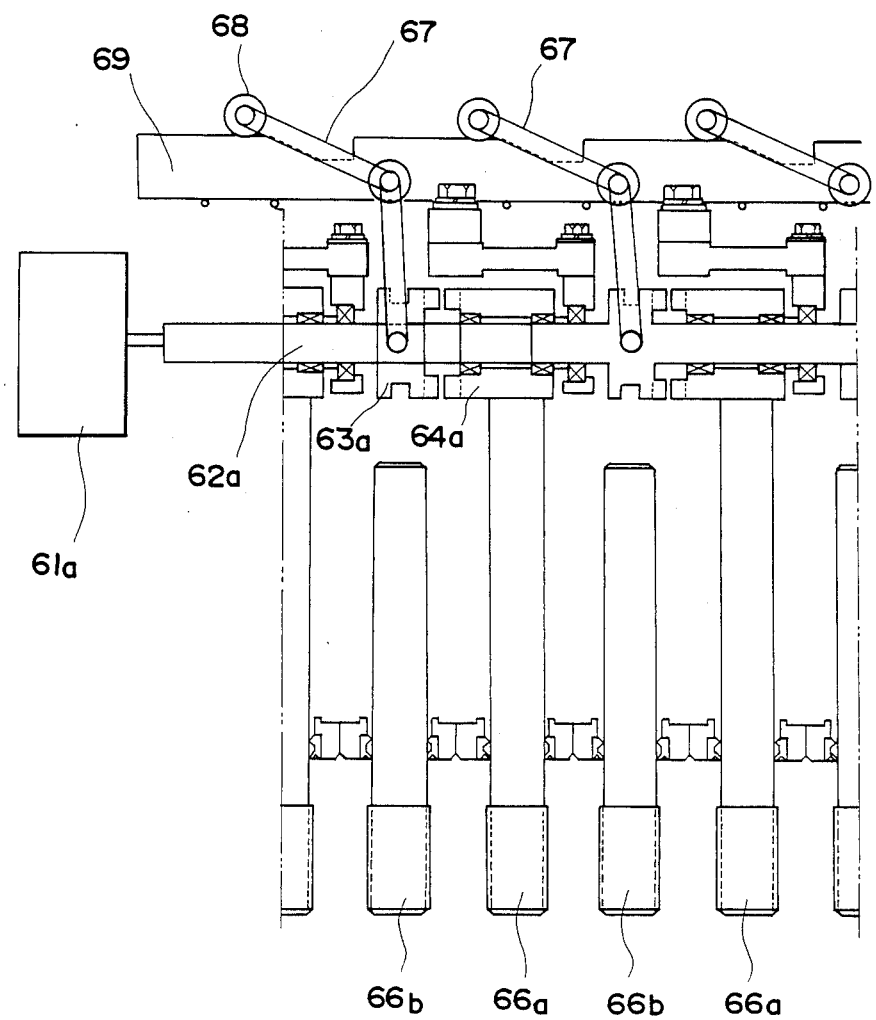
F I G. 7

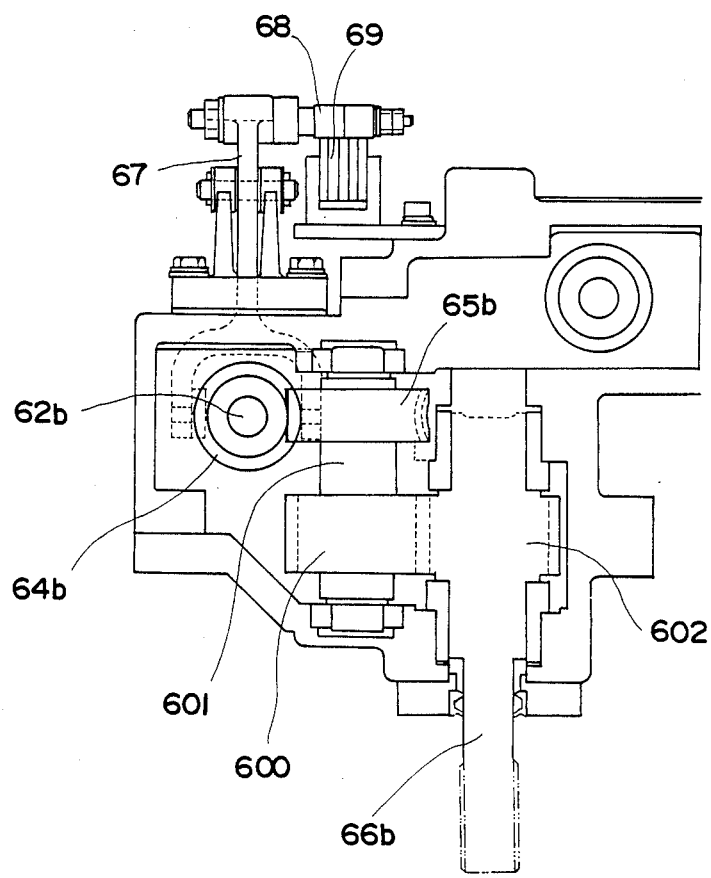
F I G. 8

FILM EXTRUSION DIE

BACKGROUND OF THE INVENTION

1. Field of the Invention

The present invention relates to a T-shaped film extrusion die for use in forming a film of a synthetic resin and, more particularly, to a T-shaped film extrusion die which can automatically adjust the thickness of a resin film with high precision within a short period of time.

2. Description of the Prior Art

There are two methods for forming resin films such as polyethylene or polypropylene films, one being a T-shaped die method and the other an inflation method. Of these two methods, the T-shaped die method has been widely used for manufacturing a material for resin bags for fertilizers, bags for packaging, moisture-proof bags or the like by forming a polyethylene, polypropylene, or ethylene-vinyl acetate film by extrusion and laminating the hot resin film formed by extrusion with a metal foil, Cellophane paper, kraft paper or the like and then pressing the whole together by a roller.

Therefore, the resin film obtained by the T-shaped film extrusion die (T-shaped die) is required to have a uniform thickness.

In a conventional T-shaped die, the thickness of a resin film is adjusted as follows. The width between lips of the T-shaped die (distance between the lips: lip-width) as the width of a resin discharge orifice thereof is manually adjusted by a plurality of bolts (lip-width adjusting bolts) arranged along the widthwise direction of the T-shaped die to obtain a resin film having a desired thickness. Thereafter, a resin film is then formed by extrusion at a predetermined temperature, and is wound into a roll shape. The thicknesses of respective portions of the roll are measured to calculate a three-dimensional pattern (unevenness in thickness) of the resin film, i.e., a deviation in thickness. According to thus obtained data, resin temperatures at respective portions in the T-shaped die are adjusted by a plurality of heaters arranged along the widthwise direction of the T-shaped die, thereby correcting the deviation in thickness. However, adjustment of the deviation in thickness based on the resin temperature cannot be quickly performed with high precision since adjustment of resin temperature takes much time.

Since the take-up speed of a resin film is as high as 100 m/min, a resin film having a nonuniform thickness wound during this interval (the time required for said adjustment of the deviation in thickness) is wasted, resulting in a disadvantage in terms of economy.

In addition to above thickness adjustment at the beginning of resin film formation using a T-shaped die, the thickness of the resin film must be corrected during its operation. More specifically, since four to five lip-width adjusting bolts fall within a temperature control range of one heater, if a deviation in thickness of the film falls within the range of one heater, the lip-width must be finely adjusted (corrected) by the lip-width adjusting bolts. Fine adjustment of the lip-width, heretofore, must be performed after the formation of a resin film by extrusion is interrupted. For this reason, the formation of a resin film must be interrupted for 30 minutes or more, resulting in a considerable time loss.

Further, since there are approximately 30 to 60 lip-width adjusting bolts in a T-shaped die, it is inefficient and cumbersome to manually adjust the bolts In addition, since the T-shaped die is heated to a high temperature during its operation, it is dangerous to adjust the bolts, resulting in very poor operativeness (operation efficiency) of the T-shaped die used.

As described above, it takes much time to adjust the thickness of a resin film in a conventional T-shaped die, and it is difficult to desirably control the thickness of the resin film as a product In addition, when a conventional T-shaped die is used to form a resin film, a large amount of a resin film having a nonuniform thickness, which cannot be used as a product, is formed, resulting in a disadvantage in terms of economy.

SUMMARY OF THE INVENTION

The present invention has been made in consideration of the problems mentioned above, and has as its object to provide a T-shaped film extrusion die which can automatically adjust the thickness of a resin film with high precision within a short period of time.

The present invention consists in a T-shaped film extrusion die comprising a T-shaped die main body, a device for measuring a thickness of a resin film formed by extrusion to generate a detection signal transmitting the found thickness, a device for generating a correction signal on the basis of a difference between the detection signal (found thickness) and preset thickness data (desired thickness), and a lip-width adjusting device for driving lip-width adjusting bolts on the basis of the correction signal to adjust the width between lips (lip-width) of the die so that the resin film has a preset thickness.

The lip-width adjusting device used in the T-shaped film extrusion die of the present invention preferably comprises a motor, a drive shaft driven by the motor, worms arranged on the drive shaft, lip-width adjusting bolt drive shafts respectively arranged near the worms, worm wheels arranged at respective one ends of the lip-width adjusting bolt drive shafts, and clutches for transmitting/disengaging a drive force of the motor from the drive shaft to the worm wheels through the worms.

In a T-shaped film extrusion die of the present invention, the thickness of a resin film formed by extrusion is quickly detected, and a data processing system comprising a CPU or the like which receives the detection signal immediately calculates a difference between a preset (desired) thickness and a measured value, and generates a correction signal. Upon reception of the correction signal, a lip-width adjusting device drives lip-width adjusting bolts to adjust the thickness of the resin film or to finely adjust a local deviation in thickness.

Therefore, in a T-shaped die of this invention, the thickness of a resin film can be automatically adjusted without requiring a manual operation and interrupting the extrusion of the resin film. In addition, formation of a resin film which cannot be used as a product is minimized by the use of a T-shaped die of this invention, thus preventing a wasteful use of a resin.

BRIEF DESCRIPTION OF THE DRAWINGS

FIG. 1 is a schematic side view showing a T-shaped film extrusion die of the present invention;

FIG. 7 is a partially transverse sectional view showing the device illustrated by FIG. 6;

FIG. 8 is a longitudinal sectional view showing another state of a lip-width adjusting device according to the present invention.

DESCRIPTION OF THE PREFERRED EMBODIMENTS

Preferred embodiments of the present invention will be described below with reference to the accompanying drawings.

Figure 2:
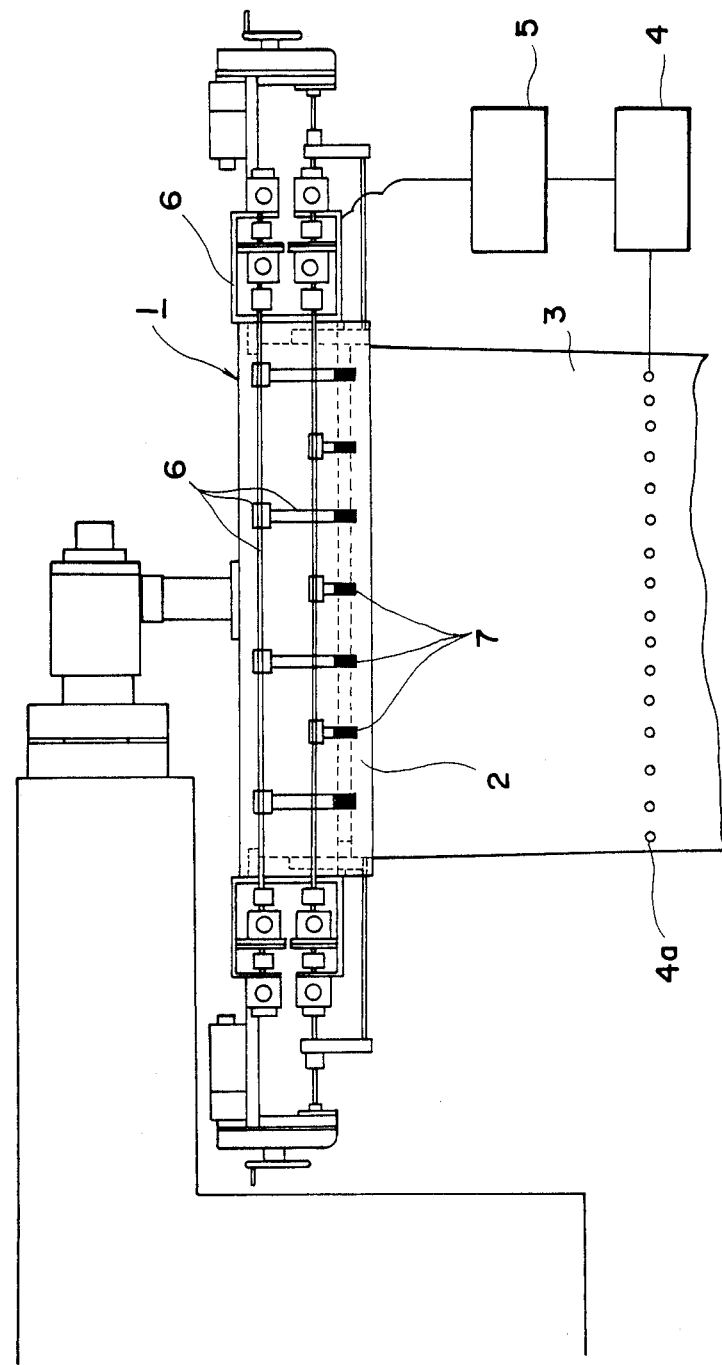
FIG. 2 is a schematic front view showing the T-shaped die illustrated by FIG. 1.

FIG. 1 is a schematic side view showing a T-shaped film extrusion die of the present invention, and FIG. 2 is a schematic front view showing the T-shaped die illustrated by FIG. 1. In FIGS. 1 and 2, reference numeral 1 denotes a T-shaped die main body; 2, a lip of the T-shaped die; 3, a resin film; 4, a thickness detection device; 5, a data processing system; 6, a lip-width adjusting device; and 7, lip-width adjusting bolts.

A molten resin introduced into the T-shaped die main body 1 is extruded through a orifice between the lips 2, thus forming the resin film 3.

The thickness of respective portions of the resin film 3 in the widthwise direction are detected by the thickness detection device 4 having thickness detectors 4a arranged at equal intervals in the widthwise direction of the resin film 3. The detected thicknesses are transmitted to the data processing system 5 as detection signals. As the thickness detection device 4, any type of device, e.g., an optical, electrical, mechanical device, or the like may be employed as far as it can precisely detect the thickness of the resin film. However, the optical device is preferable since the optical device can quickly detect the thickness in the order of 1 μm with high precision.

The data processing system 5 calculates a difference between the input thickness detection signal (found thickness) and preset thickness data (desired thickness) which is input in advance, and outputs a correction signal on the basis of the calculated data.

Figure 3:
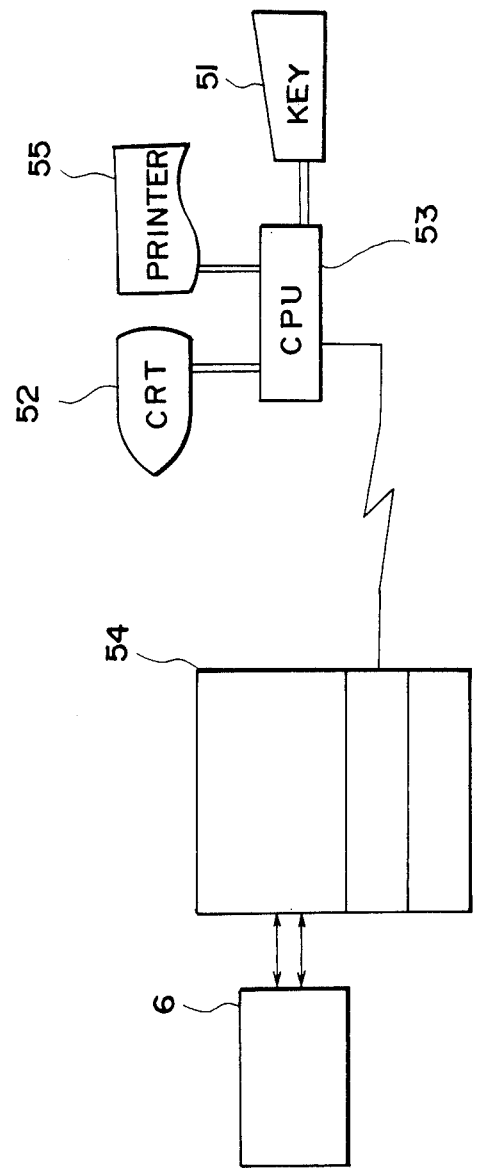
FIG. 3 is a block diagram showing a data processing system according to the present invention.

The data processing system 5 comprises a keyboard 51, a CRT display 52, a CPU 53, and a link unit 54, as shown in FIG. 3, and may by connected to a printer 55. The keyboard 51 is mainly used for inputting preset thickness data. The CRT display 52 is mainly used for displaying input data, and monitoring an adjustment control condition of the thickness of a resin film. The CPU 53 calculates a difference between the thickness detection signal and the preset thickness data, and outputs a correction signal on the basis of the calculated data. The link unit 54 links the data processing system 5 and the lip-width adjusting device 6 for driving the lip-width adjusting bolts 7. The data processing system 5 used in the present invention needs to have at least a function of storing and holding preset thickness data, a calculation function for calculating a difference between the thickness detection signal and the preset thickness, and a function for generating a correction signal on the basis of the calculation result.

The lip-width adjusting bolts 7 are driven on the basis of the correction signal transmitted from the data processing system 5 to the lip-width adjusting device 6 to adjust the width between the lips 2 and adjust the thickness of the resin film 3 thereby the thickness falls within a predetermined precision.

Figure 4:
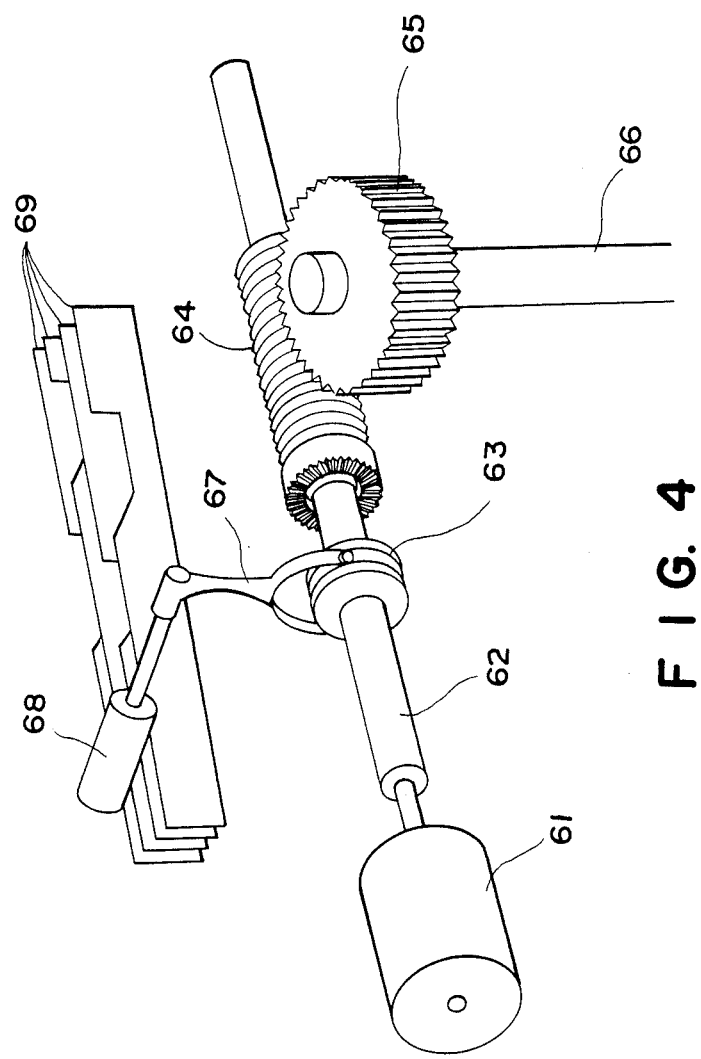
FIG. 4 is a schematic perspective view showing a lip-width adjusting device according to the present invention.

The lip-width adjusting device 6 comprises a motor 61, a drive shaft 62, worms (gears) 64, worm wheels (gears) 65, lip-width adjusting bolt drive shafts 66, and clutches 67 (drive screws 63, clutch heads 68, and clutch plates 69), as shown in FIG. 4.

The lip-width adjusting device 6 selectively drives the respective lip-width adjusting bolts 7 on the basis of the signal transmitted from the data processing system 5, i.e., a signal indicating the position of a lip-width adjusting bolt 7 to be driven and its drive amount. More specifically, in this lip-width adjusting device 6, the motors 61 arranged at two sides in the longitudinal direction of the T-shaped die drive the drive shafts 62 respectively having the drive screws 63 arranged in the same direction, and at least one of the drive screws 63 selected to be driven is engaged with the corresponding worm 64 by the corresponding clutch 67 to drive the corresponding worm wheel 65, thereby selectively transmitting the drive force of the motors 61 to the corresponding lip-width adjusting bolt drive shaft 66. In this manner, since the motors 61 are arranged to be separated from the T-shaped die main body 1, they can be protected from high-temperature heat produced by the T-shaped die main body 1.

Figure 5:
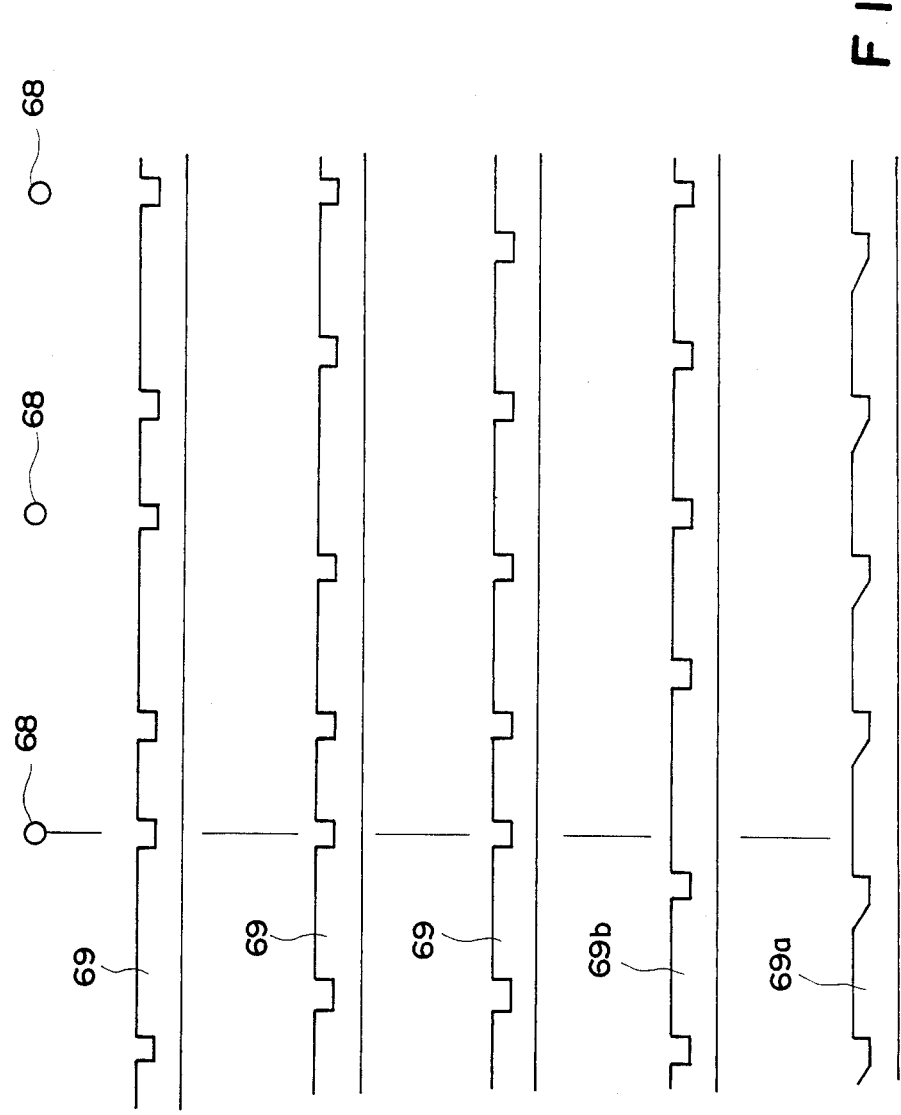
FIG. 5 is a schematic view notionally showing an operation of clutch plates (cam) used in the present invention.
Figure 6:
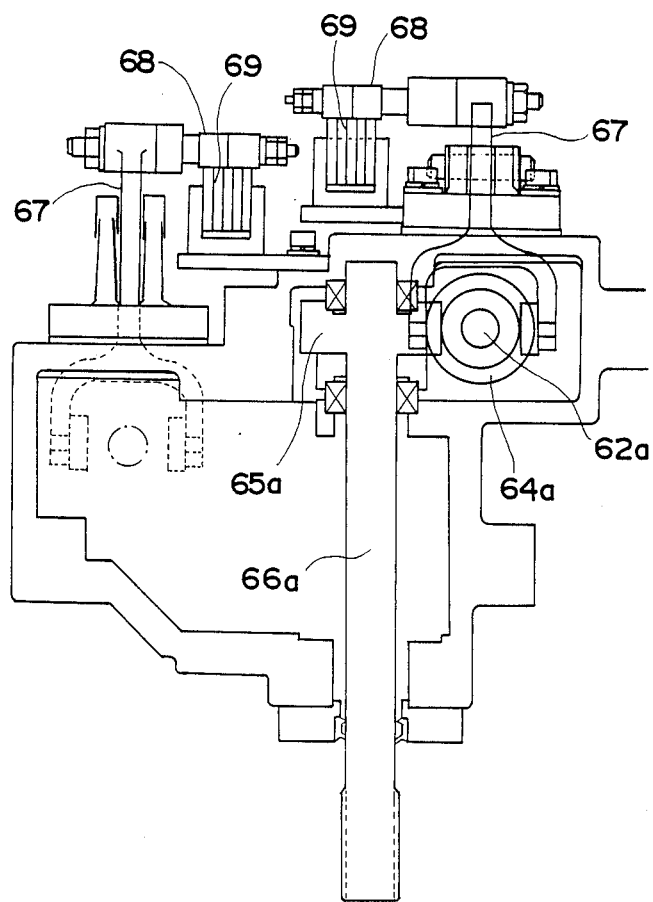
FIG. 6 is a longitudinal sectional view showing a state of a lip-width adjusting device according to the present invention.

Engagement/disengagement of each of the clutches is selectively performed by the clutch plates (cam) 69. More specifically, as shown in FIG. 4, the clutch comprises a set of clutch plates 69 arranged in parallel with each other, respectively having cuts (notches) and a clutch head 68 which is in contact with the set of clutch plates 69. The arrangement pattern of the cuts of each clutch plate is different in longitudinal relation from those of the cuts of the other clutch plates, as shown in FIG. 5, so that the clutch plates are independently parallelly moved to be capable of selectively forming a groove, the groove consisting of the cuts respectively selected from the cuts of each of the clutch plates, at each of contact positions with the clutch heads 68. In FIG. 4, the clutch plates 69 are independently parallelly moved to align or misalign the cuts of all the clutch plates 69 at a contact position of the clutch head 68, so that the clutch head 68 is operated to engage/disengage (let in or out) the clutch. For example, in FIG. 5, when the lip-width adjusting bolt (corresponding to the leftmost clutch head 68 in FIG. 5) is driven by the use of the clutch plates (69, 69a and 69b), a clutch plate 69a is independently parallelly moved to the right by one point, and a clutch plate 69b is independently parallelly moved to the right by one point, thus aligning the cuts of all the clutch plates to form a groove on the set of clutch plates at the only contact position of the clutch head 68. Thus, the clutch head 68 which is in contact with the upper portions of the clutch plates 69 (as shown in FIG. 4) falls into the groove, thus engaging the drive screw 63 and the worm 64. When the drive operation of the bolt is to be stopped, the clutch plates are returned to original positions to misalign the cuts, thus releasing above engagement. The drive shaft arranged in the longitudinal direction of the T-shaped die is used to transmit drive force, and the position of the lip-width adjusting bolt to be driven is selected by the respective clutches, so that the motor need not be arranged for each of the bolts As a result, the device can be simplified, automated with low cost. Therefore, in the bolt drive device according to the present invention, several tens of the bolts can be driven by several motors, for example, 64 bolts can be driven by four motors. The number of motors coincides with the number of lip-width adjusting bolts which can be simultaneously driven. The number of lip-width adjusting bolts varies depending on the size of the T-shaped die, and the number of motors is appropriately selected accordingly.

Figure 9:
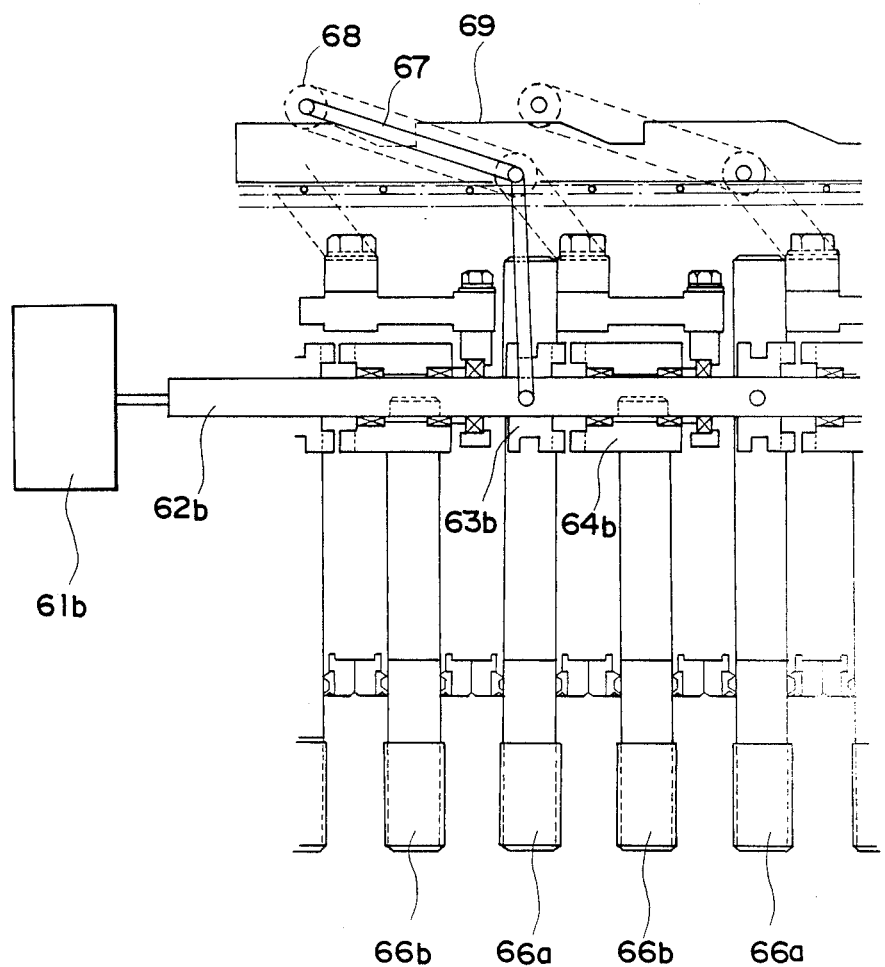
FIG. 9 is a partially transverse sectional view showing the device illustrated by FIG. 8.

An interval between adjacent lip-width adjusting bolts 7 is usually as small as 45 mm, while the diameter of low-speed/large-torque gear (the worm 64, the worm wheel 65) is usually larger than 45 mm. Therefore, the torque gears cannot be aligned along a straight line parallel to the drive shaft for the respective lip-width adjusting bolts 7 or for each of the lip-width adjusting bolt drive shafts 66. Thus, the torque gears are arranged in the staggered relation with respect to the straight line for each of the lip-width adjusting bolts 7, e.g., are alternately arranged in a right-and-left direction at different levels for every other bolt. The worm wheels having the identical positional relationship are driven by the identical drive shaft. For example, as shown in FIGS. 6 to 9, a drive shaft 62a drives lip-width adjusting bolt drive shafts 66a (arranged for every other bolt) each having a worm wheel 65a (FIGS. 6 and 7), while a drive shaft 62b drives lip-width adjusting bolt drive shafts 66b (arranged for every other bolt) each having a spur gear 602 through shafts 601 each having a worm wheel 65b and a spur gear 600 (FIGS. 8 and 9). In order to allow finer adjustment of the width between the lips, a gear ratio of gears used in a T-shaped die of this invention is preferably set such that a gear is rotated once in about 1 minute, and a lip-width adjusting bolt drive shaft is rotated by a $\frac{1}{4}$ revolution accordingly.

The lip-width adjusting device 6 is not particularly limited as far as it has a mechanism for driving the respective lip-width adjusting bolts 7 (at arbitrary positions) by each arbitrary amount. However, the device with the above structure is preferable.

As described above, in the T-shaped film extrusion die of the present invention, the width between the lips thereof can be automatically adjusted with high precision within a short period of time.

Further, use of the T-shaped die of this invention can improve economically the production of a resin film, since the amount of resin wasted during the adjustment of the lip-width can be minimized; and can improve the efficiency of operation and save energy, since the lip-width can be adjusted without interrupting the extrusion of a resin film.

What is claimed is:

1. A T-shaped film extrusion die comprising a T-shaped die main body, a device for detecting the thickness of a resin film formed by extrusion to generate a detection signal, a device for generating a correction signal on the basis of a difference between the detection signal and preset thickness data, and a lip-width adjusting device for driving lip-width adjusting bolts on the basis of the correction signal to adjust the width between lips of the die so that the resin film has a preset thickness; said lip-width adjusting device comprising a motor, a drive shaft driven by said motor, worms arranged on said drive shaft, lip-width adjusting bolt drive shafts respectively arranged near said worms, worm wheels arranged at respective one ends of said lip-width adjusting bolt drive shafts, and clutches for transmitting/disengaging a drive force of said motor from said drive shaft to said worm wheels through said worms; and said clutch comprising a set of clutch plates respectively having cuts, the arrangement pattern of the cuts of each clutch plate being different in longitudinal relation from those of the cuts of the other clutch plates, and a clutch head arranged to be in contact with said set of clutch plates, said clutch plates being independently parallelly moved to align or misalign the cuts of said clutch plates at a contact position of said clutch head, so that said clutch head is operated to engage/disengage said clutch.

2. A T-shaped film extrusion die according to claim 1, wherein sets each consisting of one of said worms and one of said worm wheels are arranged in a staggered relation with respect to a straight line parallel to said drive shaft for each of said lip-width adjusting bolt drive shafts.

* * * * *